United States Patent
Swain et al.

(10) Patent No.: US 12,361,676 B2
(45) Date of Patent: Jul. 15, 2025

(54) METHODS, SYSTEMS, ARTICLES OF MANUFACTURE AND APPARATUS FOR CLUSTERING VERTICES OF AN N-DIMENSIONAL REGULAR POLYGON USING BEARING ANGLES

(71) Applicant: Nielsen Consumer LLC, Chicago, IL (US)

(72) Inventors: Sanjay Kumar Swain, Tampa, FL (US); Praveen Kumar Bala, Hyderabad (IN); Karthik Asokkumar, Madurai (IN)

(73) Assignee: Nielsen Consumer LLC, Chicago, IL (US)

( * ) Notice: Subject to any disclaimer, the term of this patent is extended or adjusted under 35 U.S.C. 154(b) by 430 days.

(21) Appl. No.: 17/866,147

(22) Filed: Jul. 15, 2022

(65) Prior Publication Data
US 2024/0020945 A1 Jan. 18, 2024

(51) Int. Cl.
*G06V 10/762* (2022.01)
*G06F 7/24* (2006.01)
*G06V 10/74* (2022.01)

(52) U.S. Cl.
CPC .............. *G06V 10/762* (2022.01); *G06F 7/24* (2013.01); *G06V 10/761* (2022.01)

(58) Field of Classification Search
USPC ........................................................ 382/103
See application file for complete search history.

(56) References Cited

U.S. PATENT DOCUMENTS

| | | | |
|---|---|---|---|
| 6,232,915 B1* | 5/2001 | Dean ..................... | G08G 1/207 342/357.31 |
| 9,631,938 B2* | 4/2017 | Axelrod ............... | G06Q 10/047 |
| 11,562,168 B2* | 1/2023 | Balu ..................... | G06V 10/764 |
| 12,001,517 B2* | 6/2024 | Zhang ................ | G06V 30/19107 |
| 2007/0294028 A1* | 12/2007 | Gray ..................... | G01C 21/343 701/533 |
| 2008/0275643 A1* | 11/2008 | Yaqub .................. | G01C 21/343 340/995.19 |
| 2011/0010650 A1* | 1/2011 | Hess .................... | G06F 3/04817 715/765 |
| 2019/0212977 A1* | 7/2019 | Sicurelli, III ............. | G06F 7/08 |
| 2021/0004638 A1* | 1/2021 | Meng ................... | G06F 16/906 |
| 2021/0256432 A1* | 8/2021 | Ross ................ | G06Q 10/06315 |
| 2023/0004751 A1* | 1/2023 | Li ........................... | G06F 18/22 |

\* cited by examiner

*Primary Examiner* — Ishrat I Sherali
(74) *Attorney, Agent, or Firm* — HANLEY, FLIGHT & ZIMMERMAN, LLC

(57) ABSTRACT

Methods, apparatus, systems and articles of manufacture are disclosed for text extraction from a receipt image. An example apparatus for clustering vertices, the apparatus comprises machine-readable memory, instructions, and processor circuitry to execute the machine-readable instructions to calculate a centroid corresponding to coordinates, calculate distances for respective ones of the coordinates relative to the centroid, calculate differences between the distances, determine whether ones of the differences satisfy a set of thresholds, in response to determining that ones of the differences satisfy the set of thresholds, calculate bearing angles for ones of the coordinates, determine an efficiency metric associated with respective ones of the bearing angles, sort each of the bearing angles based on the associated efficiency metric, and form coordinate clusters based on the sorted bearing angles.

17 Claims, 10 Drawing Sheets

METHODS, SYSTEMS, ARTICLES OF MANUFACTURE AND APPARATUS FOR CLUSTERING VERTICES OF AN N-DIMENSIONAL REGULAR POLYGON USING BEARING ANGLES

FIELD OF THE DISCLOSURE

This disclosure relates generally to vertex clustering, and, more particularly, to methods, systems, articles of manufacture and apparatus for clustering vertices of an n-dimensional regular polygon using bearing angles.

BACKGROUND

Coordinate clustering in datasets may be performed based on proximity of coordinates to each other. In instances wherein the coordinates are arranged as n-dimensional regular polygons, the distances between each of the coordinates, in addition to the distances between each coordinate and the centroid of the dataset, will be similar (e.g., uniform).

Figure 1:
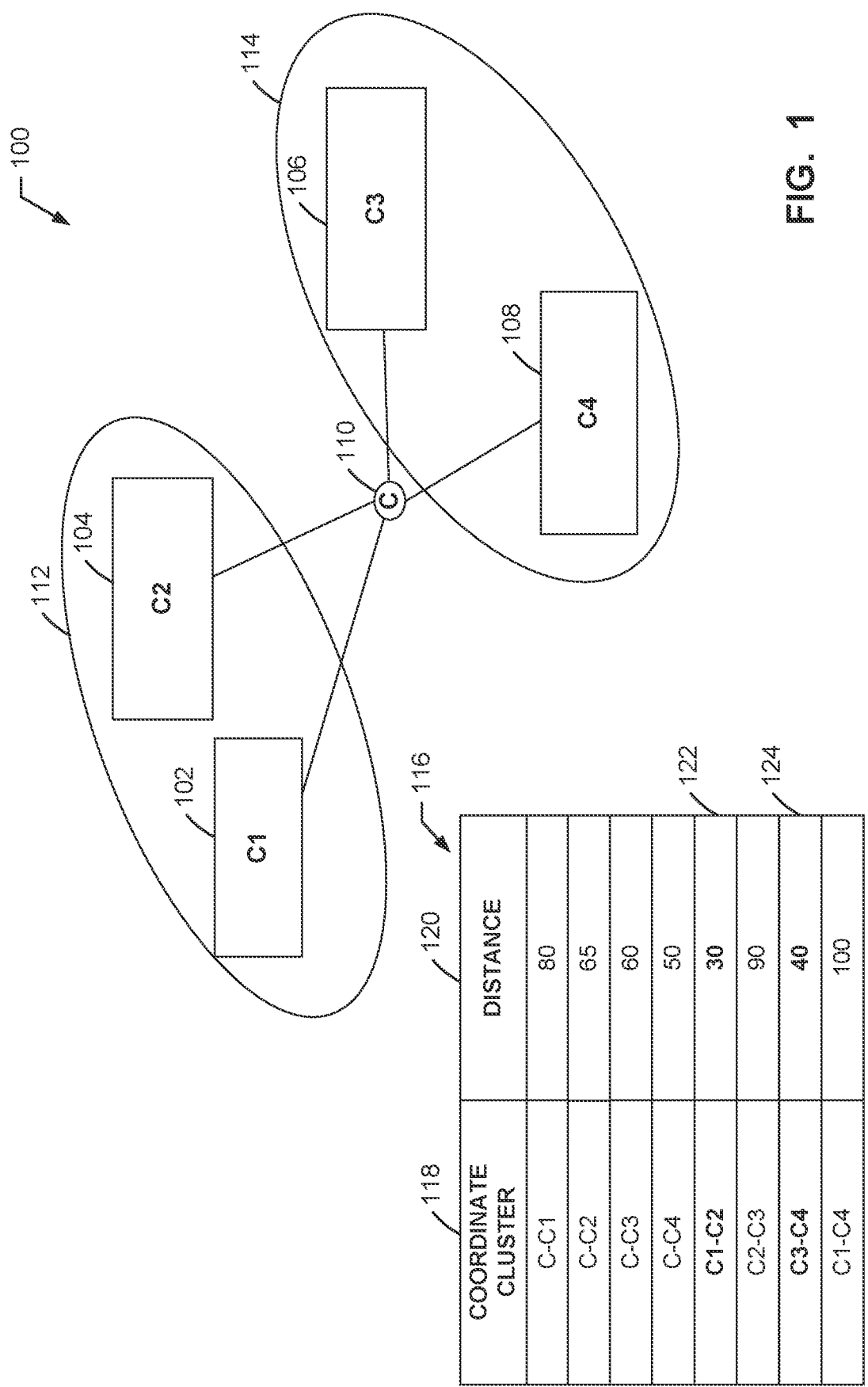
FIG. 1 is an example depiction of a vertex clustering system for a set of irregular coordinates.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Field agents regularly visit stores to collect data for market analysis, product research, etc. These field agents are often assigned the same store to visit, to allow for the building of a relationship with the store (e.g., developing a rapport with store personnel) for better data collection. In some instances, the store that a field agent is assigned may reach maximum capacity for travel, and thus, the field agent must be re-routed to another store. In the interest of efficiency, when a field agent must be reassigned an alternate store, the preference is for the agent to be routed to the next closest store. Accordingly, stores are clustered together, based on their coordinates, the clusters indicating neighboring stores. When reassignment is necessary, a field agent can be re-routed to any other store that has been clustered with their assigned store.

Current approaches to perform coordinate clustering for stores fail to account for situations wherein the coordinates of each store in a dataset are arranged to form an n-dimensional regular polygon (e.g., all stores are spaced evenly apart). In these situations, the store coordinates cannot be clustered using the standard Euclidean distances, as the distances are all uniform. Therefore, standard methods of choosing a store with the minimum distance for field agent reassignment are unable to be used, and the agent is not consistently assigned to a familiar store, thereby reducing the efficiency (e.g., represented by an efficiency metric) of data collection.

An efficiency metric, in examples disclosed herein, may be used to measure a speed and/or accuracy with which a field auditor is able to successfully complete their data collection at a given retail location (e.g., store or set of stores). In some examples, the efficiency metric may directly correlate to the time spent by a field auditor conducting data collection, however, any number of other factors may be considered.

Example methods and apparatus disclosed herein use bearing angle calculations to cluster the coordinates in the store dataset in situations where the stores are arranged as an n-dimensional regular polygon. Having the ability to perform store clustering on these store arrangements allows for the efficient assignment of field agents (e.g., to a familiar store) for all stores. For example, reassignment of a field agent to their familiar store improves efficiency since the learning curve with regard to store layout, etc. has already been performed. Examples disclosed herein utilize distance calculating techniques such as, for example, Euclidean distance calculation, bearing angle calculation, etc.

FIG. 1 illustrates an example vertex clustering system 100 for a set of irregular coordinates, wherein the set of irregular coordinates represent locations of stores where a field agent is to be assigned (e.g., Cartesian coordinates, 3D world space coordinates, etc.). The example vertex clustering system 100 includes an example set of coordinates, including example first coordinate (C1) 102, example second coordinate (C2) 104, example third coordinate (C3) 106, and example fourth coordinate (C4) 108. The example first, second, third, and fourth coordinates, 102, 104, 106, and 108, respectively, have a cluster centroid (C) 110. In examples disclosed herein, the cluster centroid (C) 110 indicates the center point of the first, second, third, and fourth coordinates, 102, 104, 106, and 108, respectively.

The example vertex clustering system 100 additionally includes an example distance matrix 116. The distance matrix 116 contains a distance 120 (e.g., in any type of distance unit, such as miles, kilometers, etc.) associated with each coordinate cluster 118. In examples disclosed herein, the distance 120 represents the Euclidean distance between the two coordinates indicated in ones of the coordinate cluster 118. For example, first row 122 indicates a coordinate cluster 118 including the first coordinate (C1) 102 and the second coordinate (C2) 104, and the associated distance 120 with the indicated coordinate cluster 118 is 30 (e.g., 30 miles). The example second row 124 indicates a coordinate cluster 118 including the third coordinate (C3) 106 and the fourth coordinate (C4) 108, and the associated distance 120 with the indicated coordinate cluster 118 is 40.

The example first cluster 112 is formed around the first coordinate (C1) 102 and the second coordinate (C2) 104. As indicated in the distance matrix 116 in the first row 122, the C1-C2 cluster (e.g., the cluster including the first coordinate (C1) 102 and the second coordinate (C2) 104) has the minimum associated distance of 30.

The example second cluster 114 is formed around the third coordinate (C3) 106 and the fourth coordinate (C4) 108. As indicated in the distance matrix 116 in the second row 124, the C3-C4 cluster (e.g., the cluster including the third coordinate (C3) 106 and the fourth coordinate (C4) 108) has the second minimum associated distance of 40 (e.g., 40 miles).

Figure 2:
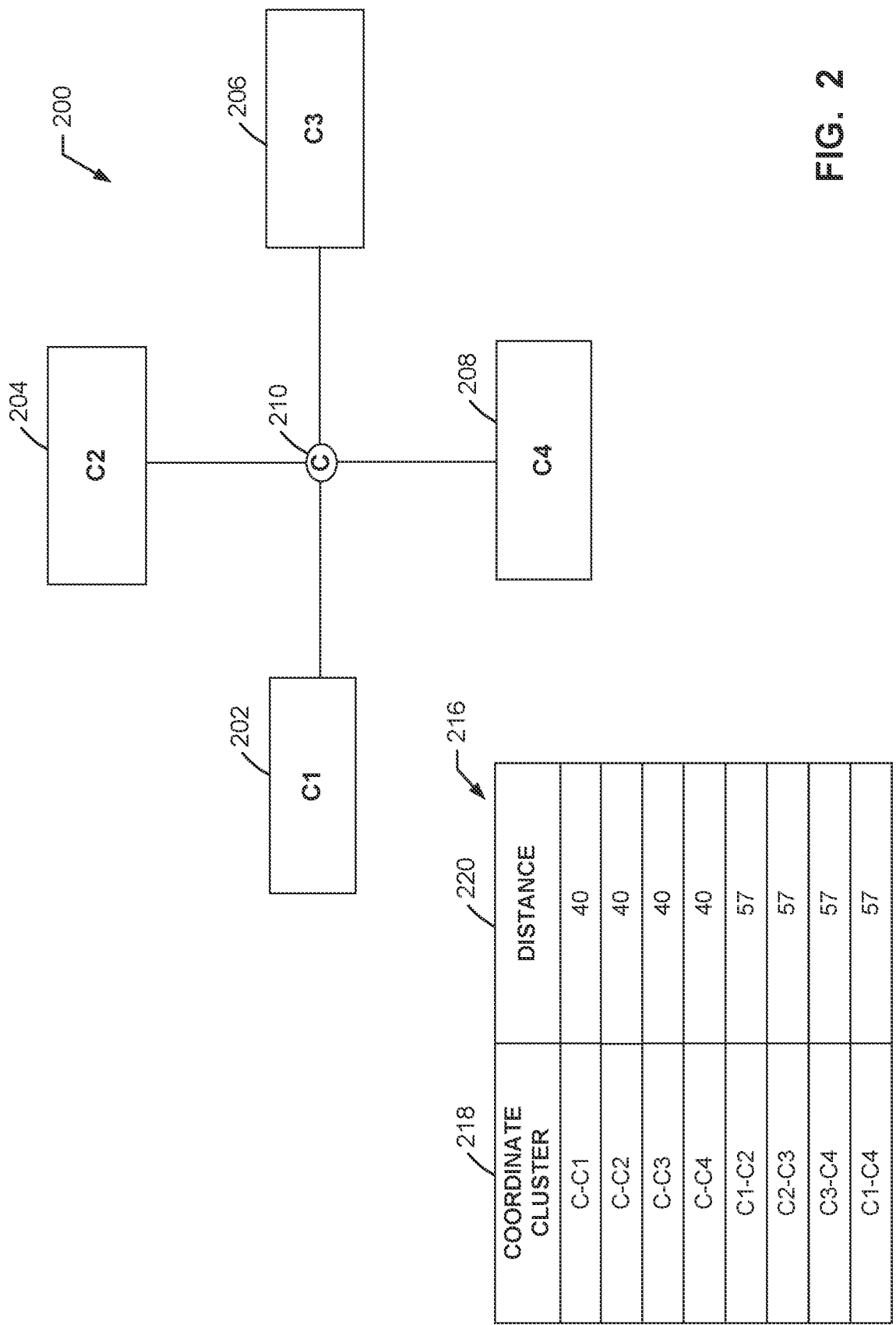
FIG. 2 is an example depiction of a mapping of a set of coordinates forming a regular polygon.

FIG. 2 illustrates an example mapping 200 of a set of coordinates forming a regular polygon. In examples disclosed herein, the set of coordinates forming a regular polygon includes example first regular coordinate (C1) 202, example second regular coordinate (C2) 204, example third regular coordinate (C3) 206, and example fourth regular coordinate (C4) 208. The example first, second, third, and fourth regular coordinates, 202, 204, 206, and 208, respectively, have a regular cluster centroid (C) 210. In examples disclosed herein, the regular cluster centroid (C) 210 indicates the center point of the first, second, third, and fourth regular coordinates, 202, 204, 206, and 208, respectively. In examples disclosed herein, "regular" is used to indicate a purely orthogonal layout of coordinates and/or coordinate clusters (e.g., regular coordinate, regular cluster, etc.). In examples wherein the example mapping 200 includes a combination of regular and irregular coordinates, the coordinate layout is considered "irregular" (e.g., not a purely orthogonal layout), and Euclidean distances may be used to calculate vertex clusters (e.g., using the vertex clustering system 100 of FIG. 1).

The illustrated example mapping 200 of FIG. 2 additionally includes an example regular distance matrix 216. The regular distance matrix 216 contains a regular distance 220 (e.g., a distance in any unit, such as miles, kilometers, etc.) associated with each regular coordinate cluster 218. In examples disclosed herein, the regular distance 220 represents the Euclidean distance between the two coordinates indicated in ones of the coordinate cluster 218, each of the regular distances 220 being of the same value. For example, the regular distance 220 between each of the first, second, third, and fourth regular coordinates, 202, 204, 206, and 208, respectively is the same (e.g., the first, second, third, and fourth regular coordinates form a regular polygon). Additionally, the regular distance 220 between each of the first, second, third, and fourth regular coordinates, 202, 204, 206, and 208, respectively, and the regular cluster centroid (C) 210 is also the same. With each of the distances between clusters being the same, coordinate clusters for coordinate sets that form a regular polygon cannot be determined based on minimum distances. Therefore, this situation forces a human decision maker to apply a discretionary choice regarding where the field agent is reassigned, thus reducing the overall efficiency of the assignment process (e.g., the human decision maker may be unaware about particular efficiency opportunities, etc.).

Figure 3:
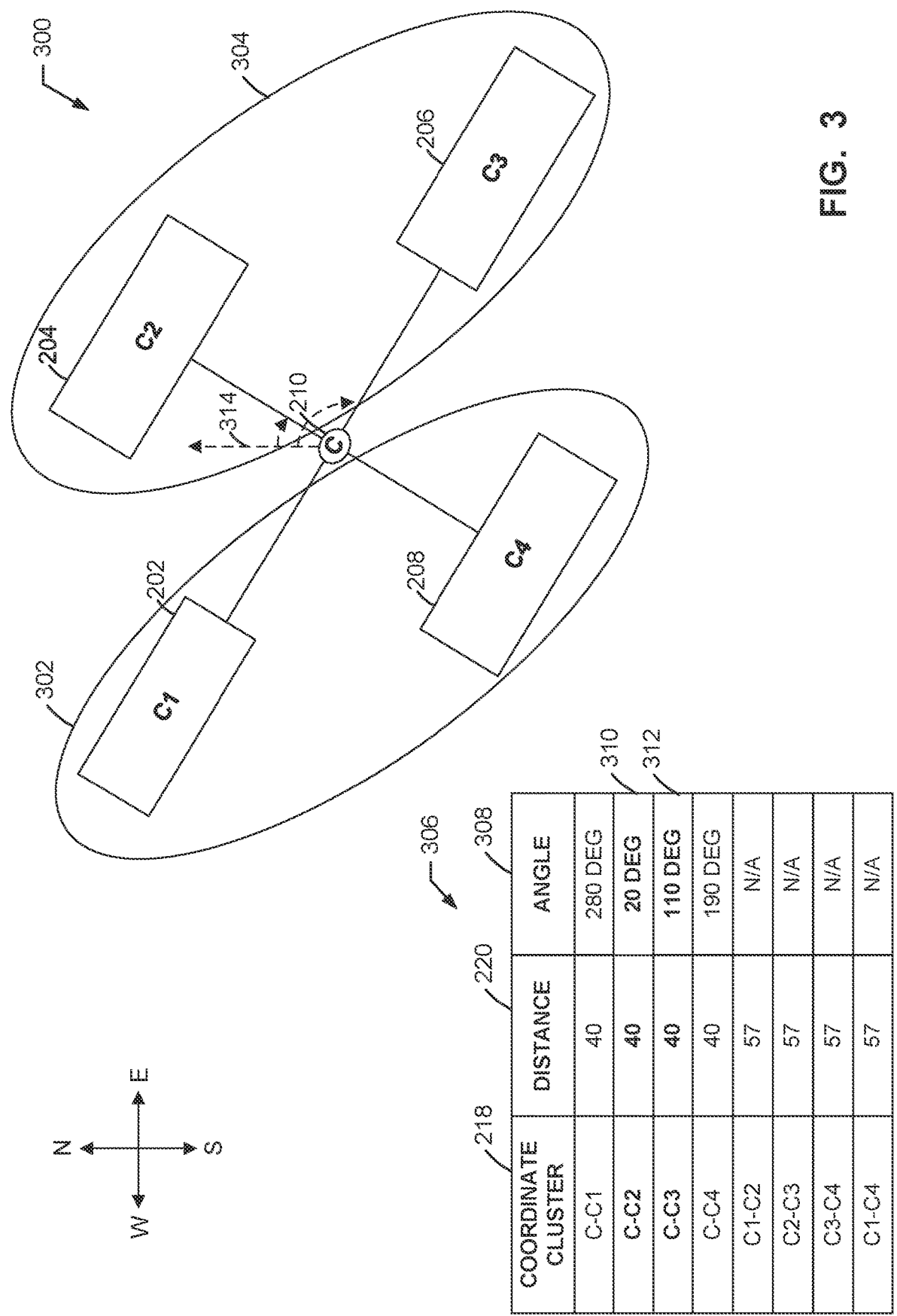
FIG. 3 illustrates an example bearing angle-based vertex clustering system for the coordinate map of FIG. 2.

FIG. 3 illustrates an example bearing angle-based vertex clustering system 300 for the example mapping 200 of FIG. 2. The first regular coordinate (C1) 202, second regular coordinate (C2) 204, third regular coordinate (C3) 206, fourth regular coordinate (C4) 208, and regular cluster centroid (C) 210 are illustrated based on their position relative to North.

The illustrated bearing angle-based vertex clustering system 300 of FIG. 3 additionally includes an example angle matrix 306. The angle matrix 306 includes an angle 308 for each coordinate cluster 218, in addition to the regular distance 220. In examples disclosed herein, the angle is calculated by tracking in a clockwise direction around the example North line 314 to each of the coordinates (e.g., the first regular coordinate (C1) 202, the second regular coordinate (C2) 204, the third regular coordinate (C3) 206, and the fourth regular coordinate (C4) 208). Additionally, in examples disclosed herein, North is represented as 0 degrees, East is represented by 90 degrees, South is represented by 180 degrees, and West is represented by 270 degrees.

An example second regular cluster 302 is formed between the second regular coordinate (C2) 204 and the third regular coordinate (C3) 206. The example first angle-based row 310 shows that the angle 308 calculated for the second regular coordinate (C2) 204 is 20 degrees. Additionally, the example second angle-based row 312 shows that the angle 308 calculated for the third regular coordinate (C3) 206 is 110 degrees. In examples disclosed herein, because the angle 308 associated with the second regular coordinate (C2) 204 and the third regular coordinate (C3) 206 are the two smallest angle values in the angle matrix 306, they form the first regular cluster 304.

Accordingly, the first regular coordinate (C1) 202 and the fourth regular coordinate (C4) 208 are grouped together in the example second regular cluster 302 as the two remaining coordinates in the coordinate set.

Figure 4A:
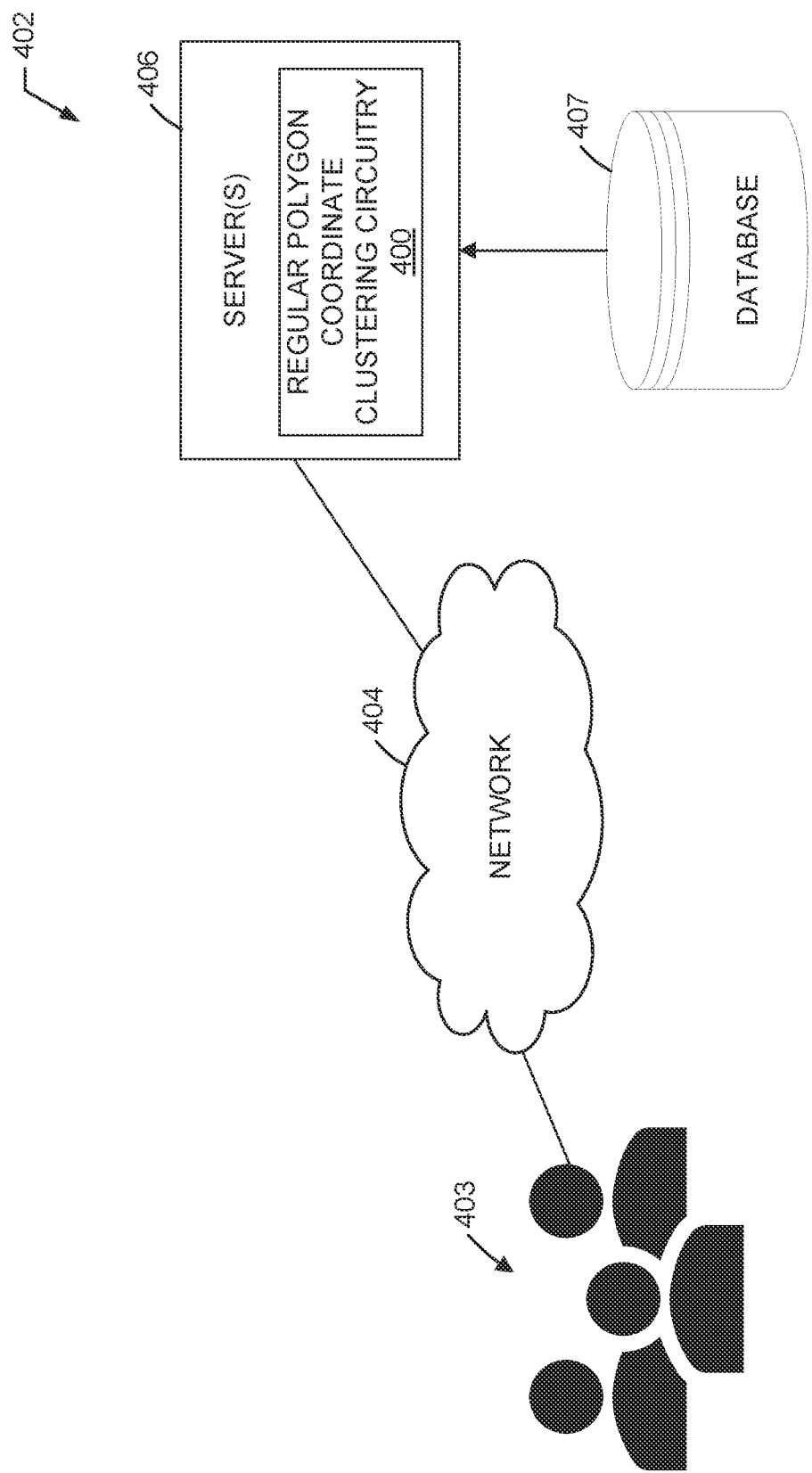
FIG. 4A is a block diagram of an example environment in which input from a database is processed by a set of servers including regular polygon coordinate clustering circuitry across a network to a group of field agents for vertex clustering and store assignment.

FIG. 4A is a block diagram of an example environment 402 in which input from an example database 407 is processed by a set of servers 406 including example regular polygon coordinate clustering circuitry 400 across an example network 404 to an example group of field agents 403 for vertex clustering and store assignment.

Figure 4B:
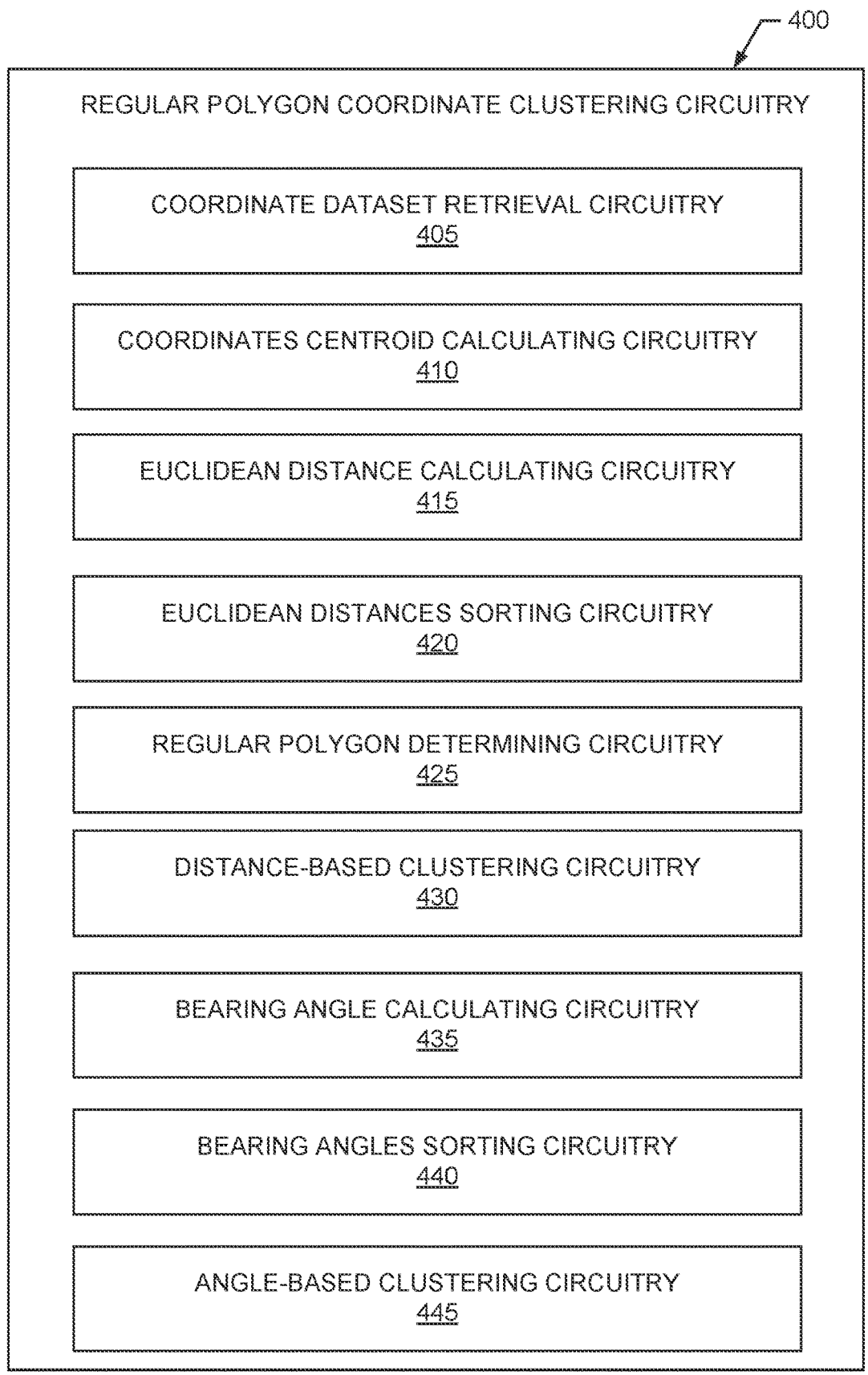
FIG. 4B is a block diagram of an example implementation of the bearing angle-based vertex clustering system of FIG. 3.

In some examples, the set of servers 406 may include any number of servers used to transmit information determined by the example regular polygon coordinate clustering circuitry 400, described further in conjunction with FIG. 4B, across the example network 404 to the group of field agents 403. In examples disclosed herein, the set of servers 406 are configured to transmit information relating to store assignments to the group of field agents 403 via the network 404.

The example database 407 may include information regarding store locations for a particular retailer (e.g., store addresses, Cartesian coordinates, etc.), which is used as input to the regular polygon coordinate clustering circuitry 400 (described further in conjunction with FIG. 4B) within the example set of servers 406.

While the example of FIG. 4A communicatively couples components via a network 404, any one or more networks of one or more types may be utilized. For example, the network 404 may be implemented by any combination of local area networks, wide area networks, wired networks, wireless networks, etc.

FIG. 4B is a block diagram of an example implementation of the bearing angle-based vertex clustering system 300 of FIG. 3, implemented in accordance with the teachings of this disclosure.

In the illustrated example of FIG. 4B, regular polygon coordinate clustering circuitry 400 includes example coordinate dataset retrieval circuitry 405, example coordinates centroid calculating circuitry 410, example Euclidean distance calculating circuitry 415, example Euclidean distances sorting circuitry 420, example regular polygon determining circuitry 425, example distance-based clustering circuitry 430, example bearing angle calculating circuitry 435, example bearing angles sorting circuitry 440, and example angle-based clustering circuitry 445.

In operation, the example coordinate dataset retrieval circuitry 405 obtains a dataset of coordinates to be clustered. In some examples, the bearing angle-based clustering system 300 may operate in conjunction with a database containing coordinate dataset, the coordinate dataset retrieval circuitry 405 to communicate with the database to obtain the coordinate dataset.

In some examples, the example coordinate dataset retrieval circuitry 405 of FIG. 4B includes means for retrieving a dataset of coordinates for clustering. For example, the means for retrieving a dataset of coordinates for clustering may be implemented by coordinate dataset retrieval circuitry 405. In some examples, the dataset retrieval circuitry 405 may be implemented by machine executable instructions such as that implemented by at least block 502 of FIG. 5 executed by processor circuitry, which may be implemented by the example processor circuitry 625 of FIG. 6, the example processor circuitry 700 of FIG. 7, and/or the example Field Programmable Gate Array (FPGA) circuitry 1300 of FIG. 13. In other examples, the coordinate dataset retrieval circuitry 405 is implemented by other hardware logic circuitry, hardware implemented state machines, and/or any other combination of hardware, software, and/or firmware. For example, the coordinate dataset retrieval circuitry 405 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example coordinates centroid calculating circuitry 410 determines the centroid of all coordinates in the coordinate dataset obtained by the coordinate dataset retrieval circuitry 405. In examples disclosed herein, the centroid may be calculated by the coordinates centroid calculating circuitry 410 by averaging the coordinates of each data point in the dataset.

In some examples, the example coordinates centroid calculating circuitry 410 of FIG. 4B includes means for calculating the centroid of all coordinates in the dataset. For example, the means for calculating the centroid of all coordinates in the dataset may be implemented by coordinates centroid calculating circuitry 410. In some examples, the coordinates centroid calculating circuitry 410 may be implemented by machine executable instructions such as that implemented by at least block 504 of FIG. 5 executed by processor circuitry, which may be implemented by the example processor circuitry 625 of FIG. 6, the example processor circuitry 700 of FIG. 7, and/or the example Field Programmable Gate Array (FPGA) circuitry 1300 of FIG. 13. In other examples, the coordinates centroid calculating circuitry 410 is implemented by other hardware logic circuitry, hardware implemented state machines, and/or any other combination of hardware, software, and/or firmware. For example, the coordinates centroid calculating circuitry 410 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example Euclidean distance calculating circuitry 415 calculates the Euclidean distances between each of the coordinates in the dataset, as well as the Euclidean distances between each coordinate and the centroid that was determined by the coordinates centroid calculating circuitry 410. In examples disclosed herein, the calculated Euclidean distances may be stored in a matrix, array, etc. along with their corresponding coordinates (e.g., a distance of 30 was calculated between coordinates C1 and C2).

In some examples, the example Euclidean distance calculating circuitry 415 of FIG. 4B includes means for calculating the Euclidean distances between every pair of coordinates in the dataset, as well as between every coordinate and the calculated centroid point. For example, the means for calculating the Euclidean distances between every pair of coordinates in the dataset, as well as between every coordinate and the calculated centroid point may be implemented by Euclidean distance calculating circuitry 415. In some examples, the Euclidean distance calculating circuitry 415 may be implemented by machine executable instructions such as that implemented by at least blocks 506, 508 of FIG. 5 executed by processor circuitry, which may be implemented by the example processor circuitry 625 of FIG. 6, the example processor circuitry 700 of FIG. 7, and/or the example Field Programmable Gate Array (FPGA) circuitry 1300 of FIG. 13. In other examples, the Euclidean distance calculating circuitry 415 is implemented by other hardware logic circuitry, hardware implemented state machines, and/or any other combination of hardware, software, and/or firmware. For example, the Euclidean distance calculating circuitry 415 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example Euclidean distances sorting circuitry 420 sorts the calculated Euclidean distances and their associated coordinate pairs. In examples disclosed herein, the Euclidean distances sorting circuitry 420 may sort the Euclidean distances in ascending order, however the Euclidean distances may be sorted in descending order, etc. in other examples.

In some examples, the example Euclidean distances sorting circuitry 420 of FIG. 4B includes means for sorting the calculated Euclidean distances and their associated coordinate pairs. For example, the means for sorting the calculating Euclidean distances and their associated coordinate pairs may be implemented by Euclidean distances sorting circuitry 420. In some examples, the Euclidean distances sorting circuitry 420 may be implemented by machine executable instructions such as that implemented by at least block 510 of FIG. 5 executed by processor circuitry, which may be implemented by the example processor circuitry 625 of FIG. 6, the example processor circuitry 700 of FIG. 7, and/or the example Field Programmable Gate Array (FPGA) circuitry 1300 of FIG. 13. In other examples, the Euclidean distances sorting circuitry 420 is implemented by other hardware logic circuitry, hardware implemented state machines, and/or any other combination of hardware, software, and/or firmware. For example, the Euclidean distances sorting circuitry 420 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example regular polygon determining circuitry 425 determines whether the coordinates in the dataset form a regular polygon (e.g., the coordinates are mapped orthogonally). In examples disclosed herein, the regular polygon determining circuitry 425 may establish that the coordinates form a regular polygon by determining a difference between each of the Euclidean distances, sorted by the Euclidean distances sorting circuitry 420, and establishing whether these difference values fall within a range of values indicated by a set of thresholds (e.g., a minimum threshold and a maximum threshold). If the regular polygon determining circuitry 425 determines that each of the calculated Euclidean distance differences satisfy the thresholds, arrangement of the coordinates as a regular polygon is indicated. In some examples, wherein regular and irregular coordinates are combined to form a polygon that has at least two sides that are equal and at least two sides that are not, a combination of Euclidean and/or bearing angles may be used to calculate vertex clusters (e.g., using the vertex clustering system 100 of FIG. 1 and/or the bearing angle based vertex clustering system 300 described in conjunction with FIG. 3). For example, if the coordinates were to form a polygon that had four equal sides (e.g., Euclidean distances between each of the coordinates are equal) and two unequal sides (e.g., Euclidean distances between each of the associated coordinates are different), the vertex clustering system 100 of FIG. 1 may be used first to cluster the two unequal sides, followed by the bearing angle based vertex clustering system 300 of FIG. 3 to cluster the vertices of the equal sides.

In some examples, the example regular polygon determining circuitry 425 of FIG. 4B includes means for determining whether the coordinates in the dataset form a regular polygon. For example, the means for determining whether the coordinates in the dataset form a regular polygon may be implemented by regular polygon determining circuitry 425. In some examples, the regular polygon determining circuitry 425 may be implemented by machine executable instructions such as that implemented by at least block 512 of FIG. 5 executed by processor circuitry, which may be implemented by the example processor circuitry 625 of FIG. 6, the example processor circuitry 700 of FIG. 7, and/or the example Field Programmable Gate Array (FPGA) circuitry 1300 of FIG. 13. In other examples, the regular polygon determining circuitry 425 is implemented by other hardware logic circuitry, hardware implemented state machines, and/or any other combination of hardware, software, and/or firmware. For example, the regular polygon determining circuitry 425 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example distance-based clustering circuitry 430 groups the coordinates based on the Euclidean distances sorted by the Euclidean distances sorting circuitry 420 to form clusters. In examples disclosed herein, the coordinate pairs with the minimum distances are grouped together in clusters of two (e.g., coordinates closest to each other are grouped to form a cluster), however, any number of coordinates may be grouped together in clusters based on their distances.

In some examples, the example distance-based clustering circuitry 430 of FIG. 4B includes means for creating coordinate clusters based on the sorted Euclidean distances. For example, the means for creating coordinate clusters based on the Euclidean distances may be implemented by distance-based clustering circuitry 430. In some examples, the distance-based clustering circuitry 430 may be implemented by machine executable instructions such as that implemented by at least block 514 of FIG. 5 executed by processor circuitry, which may be implemented by the example processor circuitry 625 of FIG. 6, the example processor circuitry 700 of FIG. 7, and/or the example Field Programmable Gate Array (FPGA) circuitry 1300 of FIG. 13. In other examples, the distance-based clustering circuitry 430 is implemented by other hardware logic circuitry, hardware implemented state machines, and/or any other combination of hardware, software, and/or firmware. For example, the distance-based clustering circuitry 430 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example bearing angle calculating circuitry 435 determines an angle associated with each coordinate in the dataset relative to a direction (e.g., North, South, East, or West). In examples disclosed herein, North is used as a reference, and the bearing angles are calculated for each coordinate by the bearing angle calculating circuitry 435 by measuring the angle clockwise. In examples disclosed herein, an efficiency metric may be calculated for each of the calculated bearing angles. The efficiency metric may correspond to, for example, an amount of time spent at a retail location (e.g., coordinate) by a field auditor for data collection, an accuracy of data, etc. For example, for retail locations that are familiar to the field auditor (e.g., are close in proximity), the calculated bearing angle is smaller, corresponding to a higher efficiency metric.

In some examples, the bearing angle calculating circuitry 435 of FIG. 4B includes means for calculating the bearing angle for each coordinate in the dataset, relative to a direction (e.g., North, South, East, or West). For example, the means for calculating the bearing angle for each coordinate in the dataset, relative to a direction (e.g., North, South, East, or West) may be implemented by bearing angle calculating circuitry 435. In some examples, the bearing angle calculating circuitry 435 may be implemented by machine executable instructions such as that implemented by at least block 516 of FIG. executed by processor circuitry, which may be implemented by the example processor circuitry 625 of FIG. 6, the example processor circuitry 700 of FIG. 7, and/or the example Field Programmable Gate Array (FPGA) circuitry 1300 of FIG. 13. In other examples, the bearing angle calculating circuitry 435 is implemented by other hardware logic circuitry, hardware implemented state machines, and/or any other combination of hardware, software, and/or firmware. For example, the bearing angle calculating circuitry 435 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example bearing angles sorting circuitry 440 sorts the calculated bearing angles and their associated coordinate pairs. In examples disclosed herein, the bearing angles sorting circuitry 440 may sort the bearing angles in ascending order, however the bearing angles may be sorted in descending order, etc. in other examples. Furthermore, in examples disclosed herein, the bearing angles may be sorted in order (e.g., ascending, descending, etc.) based on their associated efficiency metric, as calculated by the bearing angle calculating circuitry 435.

In some examples, the bearing angles sorting circuitry 440 of FIG. 4B includes means for sorting the calculated bearing angles and their associated coordinate pairs. For example, the means for sorting the calculated bearing angles and their associated coordinate pairs may be implemented by bearing angles sorting circuitry 440. In some examples, the bearing angles sorting circuitry 440 may be implemented by machine executable instructions such as that implemented by at least block 518 of FIG. 5 executed by processor circuitry, which may be implemented by the example processor circuitry 625 of FIG. 6, the example processor circuitry 700 of FIG. 7, and/or the example Field Programmable Gate Array (FPGA) circuitry 1300 of FIG. 13. In other examples, the bearing angles sorting circuitry 440 is implemented by other hardware logic circuitry, hardware implemented state machines, and/or any other combination of hardware, software, and/or firmware. For example, the bearing angles sorting circuitry 440 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The angle-based clustering circuitry 445 groups the coordinates based on their associated bearing angles, as sorted by the bearing angles sorting circuitry 440, to form clusters. In examples disclosed herein, the coordinate pairs with the smallest bearing angles are grouped together in clusters of two, however, any number of coordinates may be grouped together in clusters based on their bearing angles.

In some examples, the angle-based clustering circuitry 445 of FIG. 4B includes means for forming clusters based on the sorted bearing angles. For example, the means for forming clusters based on the sorted bearing angles may be implemented by angle-based clustering circuitry 445. In some examples, the angle-based clustering circuitry 445 may be implemented by machine executable instructions such as that implemented by at least block 516 of FIG. 5 executed by processor circuitry, which may be implemented by the example processor circuitry 625 of FIG. 6, the example processor circuitry 700 of FIG. 7, and/or the example Field Programmable Gate Array (FPGA) circuitry 1300 of FIG. 13. In other examples, the angle-based clustering circuitry 445 is implemented by other hardware logic circuitry, hardware implemented state machines, and/or any other combination of hardware, software, and/or firmware. For example, angle-based clustering circuitry 445 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Vertex clustering for assignment of stores to field agents is preferred due to the high efficiency and/or speed at which the field agents can be assigned stores to frequent and visit neighboring stores (e.g., be reassigned) in their clusters if their assigned stores are at maximum capacity. In examples wherein store locations are arranged in an orthogonal manner (e.g., store coordinates are arranged as a regular polygon), Euclidean distances are used in conjunction with bearing angles to determine optimal store vertex clustering. Therefore, inefficiencies by way of an added layer of decision making (e.g., a human decision maker having to establish which clusters should be formed in instances of regular coordinate mappings), etc. is minimized. In some examples, this reduction of inefficiency may be translated into at least a reduction of fuel costs associated with field agents traveling (e.g., traveling by a vehicle) to sub-optimal stores (e.g., stores that are positioned further away than others), a reduction in length of a learning curve (e.g., learning a store layout, etc.) for a field agent assigned an unfamiliar store, a reduction in time costs for determination of store assignments for each field agent, etc.

While an example manner of implementing the regular polygon coordinate clustering circuitry 400 is illustrated in FIG. 4B, one or more of the elements, processes and/or devices illustrated in FIG. 4B may be combined, divided, re-arranged, omitted, eliminated and/or implemented in any other way. Further, the example coordinate dataset retrieval circuitry 405, the example coordinates centroid calculating circuitry 410, the example Euclidean distance calculating circuitry 415, the example Euclidean distances sorting circuitry 420, the example regular polygon determining circuitry 425, the example distance-based clustering circuitry 430, the example bearing angle calculating circuitry 435, the example bearing angles sorting circuitry 440, the example angle-based clustering circuitry, and/or more generally, the regular polygon coordinate clustering circuitry 400 of FIG. 4B may be implemented by hardware, software, firmware and/or any combination of hardware, software and/or firmware. Thus, for example, any of the example coordinate dataset retrieval circuitry 405, the example coordinates centroid calculating circuitry 410, the example Euclidean distance calculating circuitry 415, the example Euclidean distances sorting circuitry 420, the example regular polygon determining circuitry 425, the example distance-based clustering circuitry 430, the example bearing angle calculating circuitry 435, the example bearing angles sorting circuitry 440, the example angle-based clustering circuitry, and/or more generally, the regular polygon coordinate clustering circuitry 400 of FIG. 4B could be implemented by processor circuitry, analog circuit(s), digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)) such as Field Programmable Gate Arrays (FPGAs). When reading any of the apparatus or system claims of this patent to cover a purely software and/or firmware implementation, at least one of the example coordinate dataset retrieval circuitry 405, the example coordinates centroid calculating circuitry 410, the example Euclidean distance calculating circuitry 415, the example Euclidean distances sorting circuitry 420, the example regular polygon determining circuitry 425, the example distance-based clustering circuitry 430, the example bearing angle calculating circuitry 435, the example bearing angles sorting circuitry 440, the example angle-based clustering circuitry, and/or more generally, the regular polygon coordinate clustering circuitry 400 of FIG. 4B is/are hereby expressly defined to include a non-transitory computer readable storage device or storage disk such as a memory, a digital versatile disk (DVD), a compact disk (CD), a Blu-ray disk, etc. including the software and/or firmware. Further still, the example coordinate dataset retrieval circuitry 405, the example coordinates centroid calculating circuitry 410, the example Euclidean distance calculating circuitry 415, the example Euclidean distances sorting circuitry 420, the example regular polygon determining circuitry 425, the example distance-based clustering circuitry 430, the example bearing angle calculating circuitry 435, the example bearing angles sorting circuitry 440, the example angle-based clustering circuitry, and/or more generally, the regular polygon coordinate clustering circuitry 400 of FIG. 4B may include one or more elements, processes and/or devices in addition to, or instead of, those illustrated in FIG. 4B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the bearing angle-based vertex clustering system 300 of FIG. 3 is illustrated in FIG. 4B, one or more of the elements, processes and/or devices illustrated in FIG. 4B may be combined, divided, re-arranged, omitted, eliminated and/or implemented in any other way. Further, the example coordinate dataset retrieval circuitry 405, the example coordinates centroid calculating circuitry 410, the example Euclidean distance calculating circuitry 415, the example Euclidean distances sorting circuitry 420, the example regular polygon determining circuitry 425, the example distance-based clustering circuitry 430, the example bearing angle calculating circuitry 435, the example bearing angles sorting circuitry 440, the example angle-based clustering circuitry, and/or more generally, the regular polygon coordinate clustering circuitry 400 of FIG. 4B may be implemented by hardware, software, firmware and/or any combination of hardware, software and/or firmware. Thus, for example, any of the example coordinate dataset retrieval circuitry 405, the example coordinates centroid calculating circuitry 410, the example Euclidean distance calculating circuitry 415, the example Euclidean distances sorting circuitry 420, the example regular polygon determining circuitry 425, the example distance-based clustering circuitry 430, the example bearing angle calculating circuitry 435, the example bearing angles sorting circuitry 440, the example angle-based clustering circuitry, and/or more generally, the regular polygon coordinate clustering circuitry 400 of FIG. 4B could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example coordinate dataset retrieval circuitry 405, the example coordinates centroid calculating circuitry 410, the example Euclidean distance calculating circuitry 415, the example Euclidean distances sorting circuitry 420, the example regular polygon determining circuitry 425, the example distance-based clustering circuitry 430, the example bearing angle calculating circuitry 435, the example bearing angles sorting circuitry 440, the example angle-based clustering circuitry, and/or more generally, the regular polygon coordinate clustering circuitry 400 of FIG. 4B is/are hereby expressly defined to include a non-transitory computer readable storage device or storage disk such as a memory, a digital versatile disk (DVD), a compact disk (CD), a Blu-ray disk, etc. including the software and/or firmware. Further still, the example bearing angle-based vertex clustering system 300 of FIG. 3 may include one or more elements, processes and/or devices in addition to, or instead of, those illustrated in FIG. 4B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Figure 5:
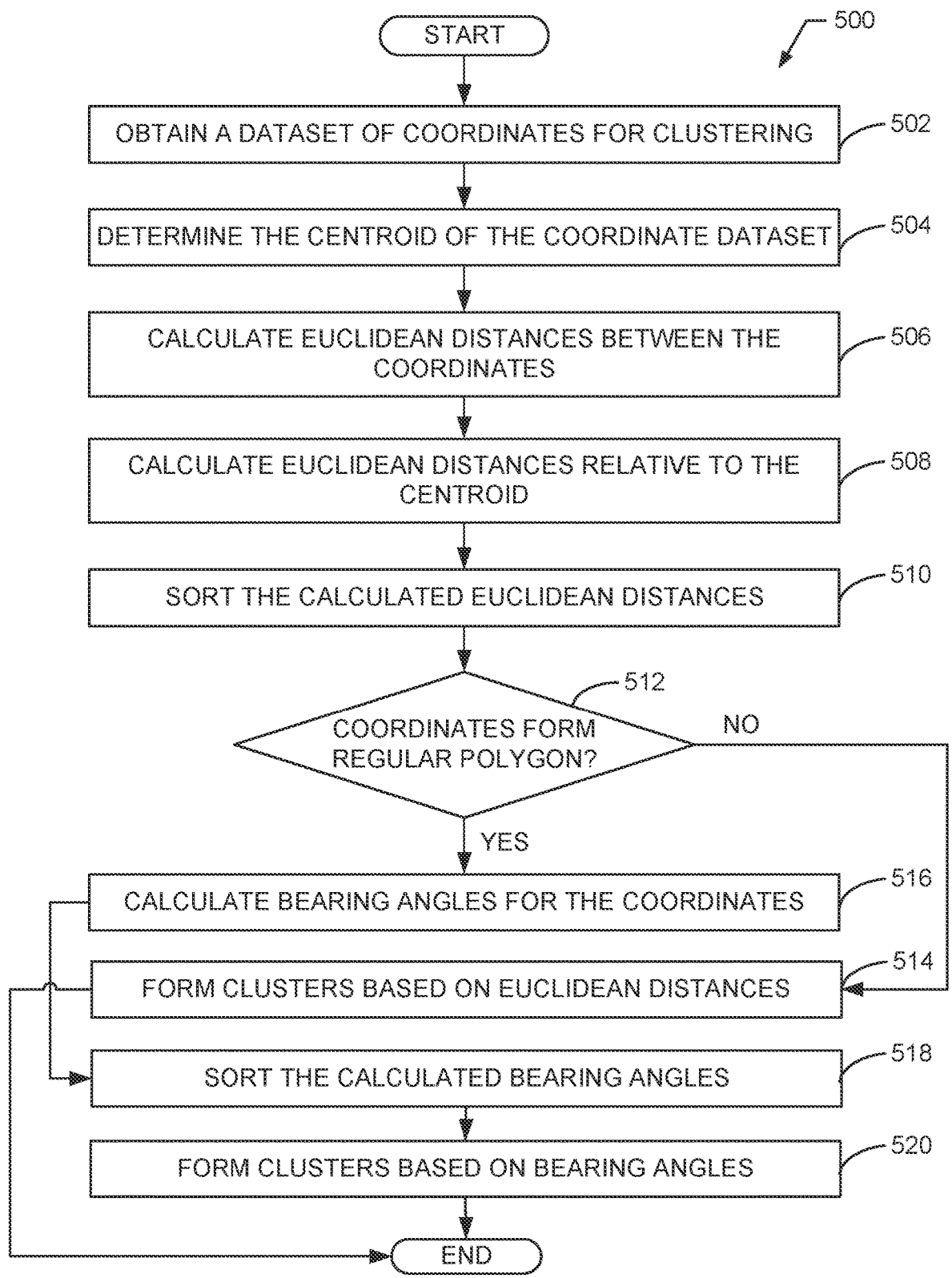
FIG. 5 is a flowchart representative of machine readable instructions which may be executed to implement the example bearing angle-based vertex clustering system of FIGS. 2 and/or 3, in accordance with the teachings of this disclosure.

A flowchart representative of example hardware logic, machine readable instructions, hardware implemented state machines, and/or any combination thereof for implementing the regular polygon coordinate clustering circuitry 400 of FIG. 4B is shown in FIG. 5. The machine readable instructions may be one or more executable programs or portion(s) of an executable program for execution by a computer processor such as the processor 625 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 625, but the entire program and/or parts thereof could alternatively be executed by a device other than the processor 625 and/or embodied in firmware or dedicated hardware. Further, although the example program is described with reference to the flowchart illustrated in FIG. 5, many other methods of implementing the example regular polygon coordinate clustering circuitry 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example process of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions 500 that may be executed by a processor to implement the example regular polygon coordinate clustering circuitry 400 of FIG. 4B to perform coordinate clustering on a dataset.

As illustrated in FIG. 5, at block 502, the coordinate dataset retrieval circuitry 405 obtains a dataset of coordinates to be used for clustering. In some examples, the coordinate dataset retrieval circuitry 405 may communicate with a database (e.g., the database 407 of FIG. 4A) to retrieve the coordinate dataset. In some examples, this database of coordinate datasets may be provided by a retailer that has addresses for their stores of interest (e.g., addresses are translated into coordinates).

At block 504, the coordinates centroid calculating circuitry 410 determines the centroid of all coordinates in the coordinate dataset obtained in block 502 by the coordinate dataset retrieval circuitry 405. In examples disclosed herein, the centroid may be calculated by averaging the coordinates of each data point in the dataset. In examples disclosed herein, the centroid is used as the basis for which the bearing angles are calculated for each vertex, as performed at block 516 by the bearing angle calculating circuitry 435.

At block 506, the Euclidean distance calculating circuitry 415 calculates the Euclidean distances between each of the coordinates in the dataset (e.g., for every combination of pairs). In examples disclosed herein, the calculated Euclidean distances may be stored in a matrix, array, etc. along with their corresponding coordinates.

At block 508, the Euclidean distance calculating circuitry 415 calculates the Euclidean distances for each coordinate, relative to the centroid of the coordinate dataset. In examples disclosed herein, the calculated Euclidean distances may be stored in a matrix, array, etc. along with their corresponding coordinates.

At block 510, the Euclidean distances sorting circuitry 420 sorts the Euclidean distances calculated by the Euclidean distance calculating circuitry 415 in blocks 506 and 508. In examples disclosed herein, the Euclidean distances and their associated coordinates may be sorted in ascending order, however, in other examples, the distances may be sorted in any other order (e.g., descending order, etc.).

At block 512, the regular polygon determining circuitry 425 determines whether the coordinates in the dataset are arranged as a regular polygon. In examples disclosed herein, the regular polygon determining circuitry 425 establishes that the coordinates form a regular polygon when all Euclidean distances between the coordinates are similar and/or when all Euclidean distances between the coordinates and the cluster centroid are similar (e.g., when a calculated set of differences between each of the Euclidean distances satisfies a set of threshold values). If the regular polygon determining circuitry 425 determines that the coordinates form a regular polygon (e.g., the stores are located orthogonally), the process moves to block 516. However, if the regular polygon determining circuitry 425 determines that the coordinates in the dataset do not form a regular polygon, the process moves forward to block 514. In some examples, if the regular polygon determining circuitry 425 determines that a combination of regular and irregular coordinates exist (e.g., some of the calculated Euclidean distances satisfy the set of threshold values and some do not), a combination of the processes of block 514 and block 516 are used to compute the vertex clusters (e.g., a combination of Euclidean distance-based vertex clustering and bearing angle-based vertex clustering).

At block 514, after the regular polygon determining circuitry 425 establishes in block 512 that the coordinates in the dataset do not form a regular polygon, the distance-based clustering circuitry 430 groups the coordinates (e.g., stores) in the dataset based on the Euclidean distances sorted by the Euclidean distances sorting circuitry 420 in block 510, to form coordinate clusters (e.g., indicating a set of stores). In examples disclosed herein, the coordinate clusters formed by the Euclidean distances sorting circuitry 420 are of the same size (e.g., all including four stores). However, in some examples wherein the coordinate clusters are of different sizes (e.g., the clusters include different numbers of stores), a weighting (e.g., calculated by multiplying the Euclidean distance by the size of the vertex) may be applied to each of the Euclidean distances calculated in block 508 of the process by the example Euclidean distance calculating circuitry 415. In examples disclosed herein, the coordinate pairs with the minimum distances are grouped together in clusters of two (e.g., coordinates closest to each other are grouped to form a cluster), however, any number of coordinates may be grouped together in clusters based on their distances.

At block 516, after the regular polygon determining circuitry 425 establishes in block 512 that the coordinates in the dataset form a regular polygon, the bearing angle calculating circuitry 435 calculates bearing angles associated with each coordinate. The example bearing angle calculating circuitry 435 determines an angle associated with each coordinate in the dataset relative to a direction (e.g., North, South, East, or West). In examples disclosed herein, North is used as a reference, and the bearing angles are calculated for each coordinate by the bearing angle calculating circuitry 435 by measuring the angle clockwise.

At block 518, the bearing angles sorting circuitry 440 sorts the calculated bearing angles and their associated coordinate pairs. In examples disclosed herein, the bearing angles sorting circuitry 440 may sort the bearing angles in ascending order, however the bearing angles may be sorted in descending order, etc. in other examples.

At block 520, the angle-based clustering circuitry 445 groups the coordinates based on their associated bearing angles, as sorted by the bearing angles sorting circuitry 440 in block 518, to form coordinate clusters. In examples disclosed herein, the coordinate pairs with the smallest bearing angles are grouped together in clusters of two, however, any number of coordinates may be grouped together in clusters based on their bearing angles.

Figure 6:
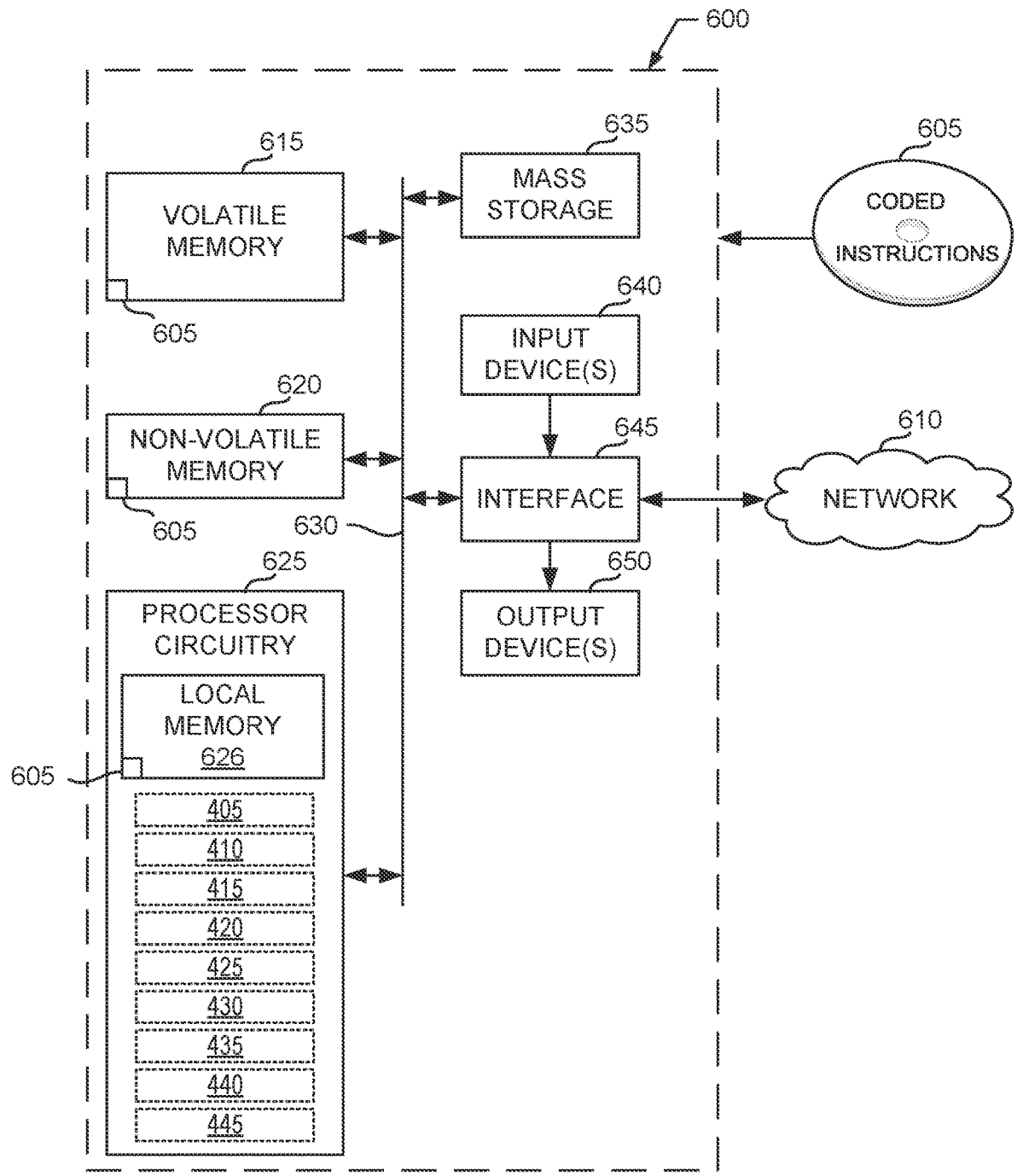
FIG. 6 is a block diagram of an example processing platform structured to execute the instructions of FIG. 5 to implement the regular polygon coordinate clustering circuitry 400 of FIG. 4B.

FIG. 6 is a block diagram of an example processor platform 600 structured to execute the instructions of FIG. 5 to implement the regular polygon coordinate clustering circuitry 400 of FIG. 4B. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 625. The processor circuitry 625 of the illustrated example is hardware. For example, the processor circuitry 625 can be implemented by one or more integrated circuits, logic circuits, FPGAs, microprocessors, CPUs, GPUs, DSPs, and/or microcontrollers from any desired family or manufacturer. The processor circuitry may be implemented by one or more semiconductor based (e.g., silicon based) devices. In this example, the processor circuitry 625 implements the example coordinate dataset retrieval circuitry 405, the example coordinates centroid calculating circuitry 410, the example Euclidean distance calculating circuitry 415, the example Euclidean distances sorting circuitry 420, the example regular polygon determining circuitry 425, the example distance-based clustering circuitry 430, the example bearing angle calculating circuitry 435, the example bearing angles sorting circuitry 440, and/or the example angle-based clustering circuitry 445.

The processor circuitry 625 of the illustrated example includes a local memory 626 (e.g., a cache, registers, etc.). The processor circuitry 625 of the illustrated example is in communication with a main memory including a volatile memory 615 and a non-volatile memory 620 via a bus 630. The volatile memory 615 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 620 may be implemented by flash memory and/or any other desired type of memory device. Access to the main memory 615, 620 is controlled by a memory controller.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 650 are also connected to the interface circuitry 645 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 645 of the illustrated example, thus, typically includes a graphics driver card, a graphics driver chip and/or a graphics driver processor.

The interface circuitry 645 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 610. The communication can be via, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 635 for storing software and/or data. Examples of such mass storage devices 635 include magnetic storage devices, floppy disk drives, HDDs, CDs, Blu-ray disk drives, redundant array of independent disks (RAID) systems, solid state storage devices such as flash memory devices, and DVD drives.

The machine executable instructions 605, which may be implemented by the machine readable instructions of FIG. 5 may be stored in the mass storage device 635, in the volatile memory 615, in the non-volatile memory 620, and/or on a removable non-transitory computer readable storage medium such as a CD or DVD.

Figure 7:
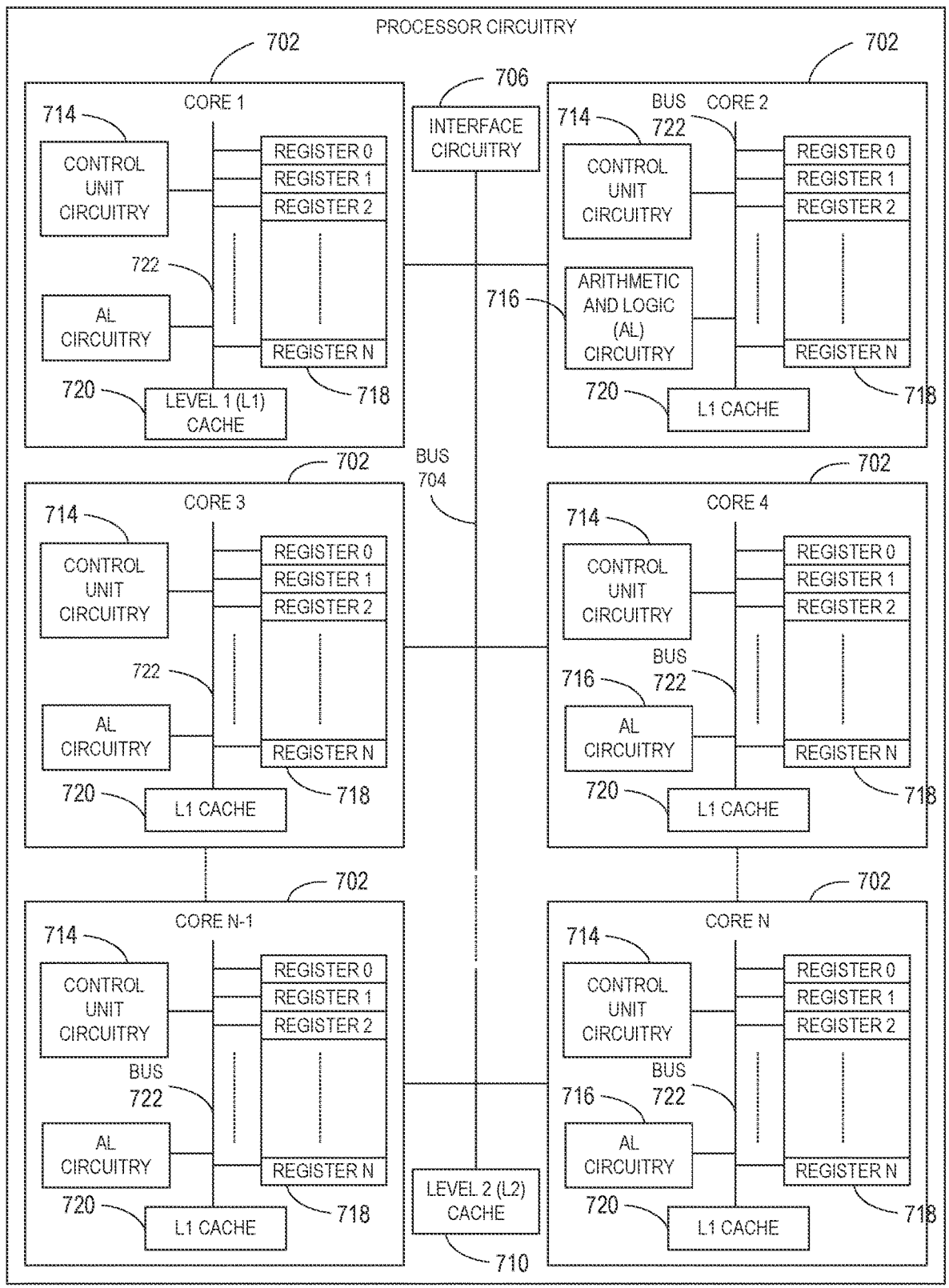
FIG. 7 is a block diagram of an example implementation of the processor circuitry of FIG. 6.

FIG. 7 is a block diagram of an example implementation of the processor circuitry 625 of FIG. 6. In this example, the processor circuitry 625 of FIG. 6 is implemented by a microprocessor 700. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 4B.

The cores 702 may communicate by an example first bus 704. In some examples, the first bus 704 may implement a communication bus to effectuate communication associated with one(s) of the cores 702. For example, the first bus 704 may implement at least one of an Inter-Integrated Circuit (I2C) bus, a Serial Peripheral Interface (SPI) bus, a PCI bus, or a PCIe bus. Additionally or alternatively, the first bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_ cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the volatile memory 615, main memory 620 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and an example second bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The second bus 722 may implement at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
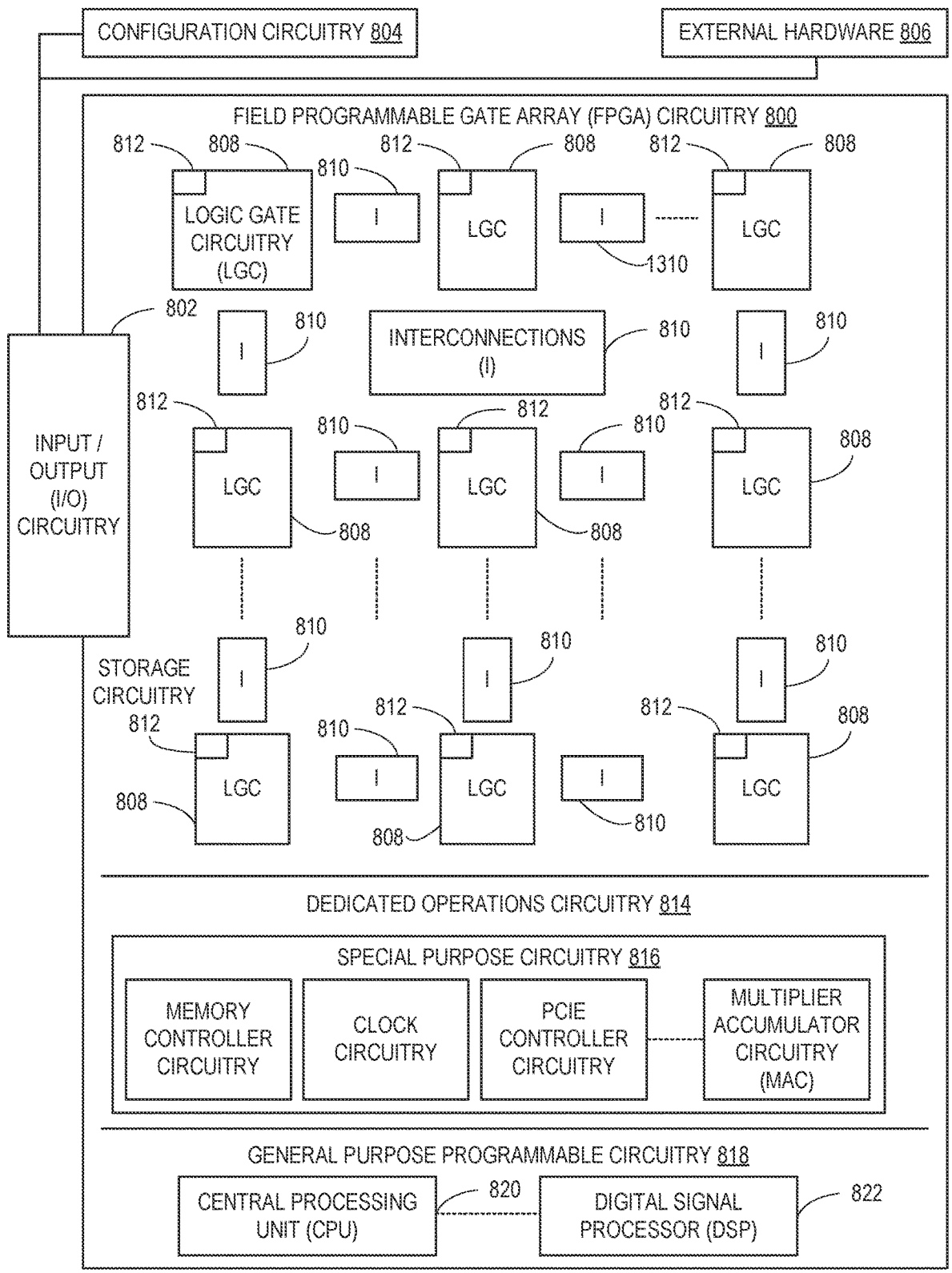
FIG. 8 is a block diagram of another example implementation of the processor circuitry of FIG. 6.
Figure 9:
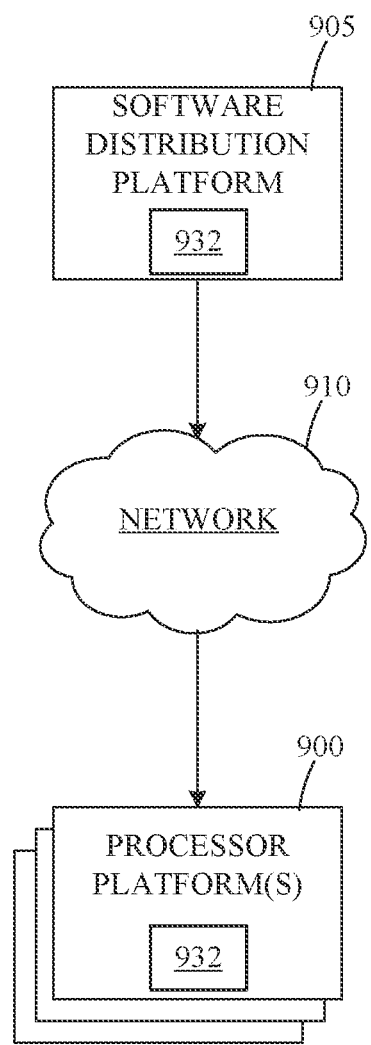
FIG. 9 is a block diagram of an example software distribution platform to distribute software (e.g., software corresponding to the example computer readable instructions of FIG. 5) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy consumers).

FIG. 8 is a block diagram of another example implementation of the processor circuitry 625 of FIG. 6. In this example, the processor circuitry 625 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIG. 4B but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowchart of FIG. 4. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowchart of FIG. 4. As such, the FPGA circuitry 800 may be structured to effectively instantiate some or all of the machine readable instructions of the flowcharts of FIG. 4B as dedicated logic circuits to perform the operations corresponding to those software instructions in a dedicated manner analogous to an ASIC. Therefore, the FPGA circuitry 800 may perform the operations corresponding to the some or all of the machine readable instructions of FIG. 4B faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 87. The logic gate circuitry 808 and interconnections 810 are configurable to instantiate one or more operations that may correspond to at least some of the machine readable instructions of FIG. 4B and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 625 of FIG. 6, many other approaches are contemplated. For example, as mentioned above, modern FPGA circuitry may include an onboard CPU, such as one or more of the example CPU 820 of FIG. 8. Therefore, the processor circuitry 625 of FIG. 6 may additionally be implemented by combining the example microprocessor 700 of FIG. 7 and the example FPGA circuitry 800 of FIG. 8. In some such hybrid examples, a first portion of the machine readable instructions represented by the flowchart of FIG. 4B may be executed by one or more of the cores 702 of FIG. 7 and a second portion of the machine readable instructions represented by the flowchart of FIG. 4B may be executed by the FPGA circuitry 800 of FIG. 8.

In some examples, the processor circuitry 625 of FIG. 6 may be in one or more packages. For example, the processor circuitry 700 of FIG. 7 and/or the FPGA circuitry 700 of FIG. 7 may be in one or more packages. In some examples, an XPU may be implemented by the processor circuitry 625 of FIG. 6, which may be in one or more packages. For example, the XPU may include a CPU in one package, a DSP in another package, a GPU in yet another package, and an FPGA in still yet another package.

Example methods, apparatus, systems, and articles of manufacture for clustering vertices of an n-dimensional regular polygon using bearing angles are disclosed herein. Further examples and combinations thereof include the following:

Example 1 includes an apparatus for clustering vertices, the apparatus comprising machine-readable memory, instructions, and processor circuitry to execute machine-readable instructions to calculate a centroid corresponding to coordinates, calculate distances for respective ones of the coordinates relative to the centroid, calculate differences between the distances, determine whether ones of the differences satisfy a set of thresholds, in response to determining that ones of the differences satisfy the set of thresholds calculate bearing angles for ones of the coordinates, determine an efficiency metric associated with respective ones of the bearing angles, sort respective ones of the bearing angles based on the associated efficiency metric, and form coordinate clusters based on the sorted bearing angles.

Example 2 includes the apparatus of example 1, wherein the coordinates are related to at least one of a store location, a group of stores, or a site location.

Example 3 includes the apparatus of example 1, wherein the processor circuitry is to perform vertex clustering on an n-dimensional regular polygon using the sorted bearing angles.

Example 4 includes the apparatus of example 1, wherein the processor circuitry is to identify an increase in the efficiency metric corresponding to a decrease in the bearing angles for ones of the coordinates.

Example 5 includes the apparatus of example 1, wherein the set of thresholds includes a minimum threshold and a maximum threshold indicating whether the coordinates are arranged as an n-dimensional regular polygon.

Example 6 includes the apparatus of example 1, wherein the processor circuitry is to calculate the bearing angles by tracking an angle of ones of the coordinates, the angle of ones of the coordinates measured counter-clockwise from a first orientation location.

Example 7 includes the apparatus of example 1, wherein ones of the coordinate clusters include clusters of two or more coordinates of the coordinates.

Example 8 includes the apparatus of example 1, wherein the processor circuitry is to form the coordinate clusters based on a determination of minimum bearing angles of the sorted bearing angles, the minimum bearing angles associated with coordinate pairs to be clustered together.

Example 9 includes the apparatus of example 1, wherein the processor circuitry is to execute the machine-readable instructions to in response to determining that ones of the differences do not satisfy the set of thresholds determine an efficiency metric associated with ones of the differences, sort ones of the calculated distances based on the associated efficiency metric, and form the coordinate clusters based on the sorted distances.

Example 10 includes a non-transitory computer readable medium comprising instructions that, when executed, cause a machine to at least calculate a centroid of corresponding to coordinates, calculate distances for respective ones of the coordinates relative to the centroid, calculate differences between the distances, determine whether ones of the differences satisfy a set of thresholds, in response to determining that ones of the differences satisfy the set of thresholds calculate bearing angles for ones of the coordinates, determine an efficiency metric associated with respective ones of the bearing angles, sort respective ones of the bearing angles based on the associated efficiency metric, and form coordinate clusters based on the sorted bearing angles.

Example 11 includes the non-transitory computer readable medium of example 10, wherein the coordinates are related to at least one of a store location, a group of stores, or a site location.

Example 12 includes the non-transitory computer readable medium of example 10, wherein the instructions, when executed, perform vertex clustering on an n-dimensional regular polygon using the sorted bearing angles.

Example 13 includes the non-transitory computer readable medium of example 10, wherein the instructions, when executed, identify an increase in the efficiency metric corresponding to a decrease in the bearing angles for ones of the coordinates.

Example 14 includes the non-transitory computer readable medium of example 10, wherein the set of thresholds includes a minimum threshold and a maximum threshold indicating whether the coordinates are arranged as an n-dimensional regular polygon.

Example 15 includes the non-transitory computer readable medium of example 10, wherein the instructions, when executed, calculate the bearing angles by tracking an angle of ones of the coordinates, the angle of ones of the coordinates measured counterclockwise from a first orientation location.

Example 16 includes the non-transitory computer readable medium of example 10, wherein ones of the coordinate clusters include clusters of two or more coordinates of the coordinates.

Example 17 includes the non-transitory computer readable medium of example 10, wherein the bearing angles are sorted in ascending order.

Example 18 includes the non-transitory computer readable medium of example 10, wherein the instructions, when executed, are to form the coordinate clusters based on a determination of minimum bearing angles of the sorted bearing angles, the minimum bearing angles associated with coordinate pairs to be clustered together.

Example 19 includes the non-transitory computer readable medium of example 10, further comprising instructions to in response to determining that ones of the differences do not satisfy the set of thresholds determine an efficiency metric associated with ones of the differences, sort ones of the calculated distances based on the associated efficiency metric, and form the coordinate clusters based on the sorted distances.

Example 20 includes a method for clustering vertices of an n-dimensional regular polygon using bearing angles comprising calculating a centroid of coordinates, calculating distances for respective ones of the coordinates relative to the centroid, calculating a differences between the distances, determining whether ones of the differences satisfy a set of thresholds, in response to determining that ones of the differences satisfy the set of thresholds calculating bearing angles for ones of the coordinates, determining an efficiency metric associated with respective ones of the bearing angles, sorting respective ones of the bearing angles based on the associated efficiency metric, and forming coordinate clusters based on the sorted bearing angles.

Example 21 includes the method of example 20, wherein the coordinates are related to at least one of a store location, a group of stores, or a site location.

Example 22 includes the method of example 20, wherein vertex clustering is performed on an n-dimensional regular polygon using the sorted bearing angles.

Example 23 includes the method of example 20, further including identifying an increase in the efficiency metric corresponding to a decrease in the bearing angles for ones of the coordinates.

Example 24 includes the method of example 20, wherein the set of thresholds includes a minimum threshold and a maximum threshold indicating whether the coordinates are arranged as an n-dimensional regular polygon.

Example 25 includes the method of example 20, wherein the bearing angles are calculated by tracking an angle of ones of the coordinates, the angle of ones of the coordinates measured counterclockwise from a first orientation location.

Example 26 includes the method of example 20, wherein ones of the coordinate clusters include clusters of two or more coordinates of the coordinates.

Example 27 includes the method of example 20, wherein the bearing angles are sorted in ascending order.

Example 28 includes the method of example 20, wherein the coordinate clusters are formed based on a determination of minimum bearing angles of the sorted bearing angles, the minimum bearing angles associated with coordinate pairs to be clustered together.

Example 29 includes the method of example 20, further comprising in response to determining that ones of the differences do not satisfy the set of thresholds determining an efficiency metric associated with ones of the differences, sorting ones of the calculated distances based on the associated efficiency metric, and forming the coordinate clusters based on the sorted distances.

From the foregoing, it will be appreciated that example methods, apparatus and articles of manufacture have been disclosed that extend the applications of vertex clustering for route planning, optimization, etc. Vertex clustering for assignment of stores to field agents is preferred due to the high efficiency and/or speed at which the field agents can visit neighboring stores in their clusters if their assigned stores are at maximum capacity. In examples wherein store locations are arranged in an orthogonal manner (e.g., store coordinates are arranged as a regular polygon), Euclidean distances are used in conjunction with bearing angles to determine optimal store vertex clustering. Therefore, inefficiencies by way of an added layer of decision making (e.g., a human decision maker having to establish which clusters should be formed in instances of regular coordinate mappings), etc. is minimized. In some examples, this reduction of inefficiency may be translated into at least a reduction of fuel costs associated with field agents traveling to sub-optimal stores (e.g., stores that are positioned further away than others), a reduction in length of a learning curve (e.g., learning a store layout, etc.) for a field agent assigned an unfamiliar store, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for clustering vertices, the apparatus comprising:
   interface circuitry;
   machine-readable instructions; and
   at least one processor circuit to be programmed by the machine-readable instructions to:
   assign first coordinates to a vehicle, the vehicle to collect data from entities located at respective ones of the first coordinates;
   based on a reassignment trigger, calculate a centroid corresponding to the first coordinates;
   calculate distances for respective ones of the first coordinates relative to the centroid;
   in response to determining that ones of the distances satisfy a threshold:
   calculate bearing angles for ones of the first coordinates;
   sort respective ones of the bearing angles based on angle values; and
   automatically reassign second coordinates to the vehicle based on relatively lowest ones of the sorted bearing angles, the reassignment to cause re-routing of the vehicle.

2. The apparatus of claim 1, wherein the first coordinates are related to at least one of a store location, a group of stores, or a site location.

3. The apparatus of claim 1, wherein one or more of the at least one processor circuit is to perform vertex clustering on an n-dimensional regular polygon using the sorted bearing angles.

4. The apparatus of claim 1, wherein one or more of the at least one processor circuit is to identify an increase in the efficiency metric corresponding to a decrease in the bearing angles for ones of the first coordinates.

5. The apparatus of claim 1, wherein the threshold includes a minimum threshold and a maximum threshold indicating whether the first coordinates are arranged as an n-dimensional regular polygon.

6. The apparatus of claim 1, wherein one or more of the at least one processor circuit is to calculate the bearing angles by tracking an angle of ones of the first coordinates, the angle of ones of the first coordinates measured counterclockwise from a first orientation location.

7. The apparatus of claim 1, wherein one or more of the at least one processor circuit is to form coordinate clusters based on a determination of minimum bearing angles of the sorted bearing angles, the minimum bearing angles associated with coordinate pairs to be clustered together.

8. The apparatus of claim 1, wherein one or more of the at least one processor circuit is to:
   in response to determining that ones of the distances do not satisfy the threshold:
   determine an efficiency metric associated with ones of the distances;
   sort ones of the calculated distances based on the associated efficiency metric; and
   form coordinate clusters based on the sorted distances.

9. At least one non-transitory computer readable medium comprising computer-readable instructions to cause a at least one processor circuit to at least:
   assign first coordinates to a vehicle, the vehicle to collect data from entities located at respective ones of the first coordinates;
   based on a reassignment trigger, calculate a centroid corresponding to the first coordinates;
   calculate distances for respective ones of the first coordinates relative to the centroid;
   in response to determining that ones of the distances satisfy a threshold:
   calculate bearing angles for ones of the first coordinates;
   sort respective ones of the bearing angles based on angle values; and
   automatically reassign second coordinates to the vehicle based on the sorted bearing angles, the reassignment to cause re-routing of the vehicle.

10. The at least one non-transitory computer readable medium of claim 9, wherein the first coordinates are related to at least one of a store location, a group of stores, or a site location.

11. The at least one non-transitory computer readable medium of claim 9, wherein the computer-readable instructions are to cause one or more of the at least one processor circuit to perform vertex clustering on an n-dimensional regular polygon using the sorted bearing angles.

12. The at least one non-transitory computer readable medium of claim 9, wherein the computer-readable instructions are to cause one or more of the at least one processor circuit to identify an increase in the efficiency metric corresponding to a decrease in the bearing angles for ones of the first coordinates.

13. The at least one non-transitory computer readable medium of claim 9, wherein the threshold includes a minimum threshold and a maximum threshold indicating whether the first coordinates are arranged as an n-dimensional regular polygon.

14. The at least one non-transitory computer readable medium of claim 9, wherein the computer-readable instructions are to cause one or more of the at least one processor circuit to calculate the bearing angles by tracking an angle of ones of the first coordinates, the angle of ones of the first coordinates measured counterclockwise from a first orientation location.

15. The at least one non-transitory computer readable medium of claim 9, wherein the computer-readable instructions are to cause one or more of the at least one processor circuit to sort the bearing angles in ascending order.

16. The at least one non-transitory computer readable medium of claim 9, wherein the computer-readable instructions are to cause one or more of the at least one processor circuit to form coordinate clusters based on a determination of minimum bearing angles of the sorted bearing angles, the minimum bearing angles associated with coordinate pairs to be clustered together.

17. The at least one non-transitory computer readable medium of claim 9, wherein the computer-readable instructions to cause one or more of the at least one processor circuit to:
  in response to determining that ones of the distances do not satisfy the threshold:
    determine an efficiency metric associated with ones of the distances;
    sort ones of the calculated distances based on the associated efficiency metric; and
    form coordinate clusters based on the sorted distances.

* * * * *